US012693660B2

(12) United States Patent
Lee et al.

(10) Patent No.: US 12,693,660 B2
(45) Date of Patent: Jul. 28, 2026

(54) AUTONOMOUS VEHICLE, CONTROL METHOD FOR REMOTELY CONTROLLING THEREOF

(71) Applicants: HYUNDAI MOTOR COMPANY, Seoul (KR); Kia Corporation, Seoul (KR)

(72) Inventors: Hyun Cheol Lee, Seongnam-si (KR); Wan Jae Lee, Suwon-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 428 days.

(21) Appl. No.: 17/970,972

(22) Filed: Oct. 21, 2022

(65) Prior Publication Data

US 2023/0315085 A1 Oct. 5, 2023

(30) Foreign Application Priority Data

Apr. 5, 2022 (KR) ......................... 10-2022-0042187

(51) Int. Cl.
*G05D 1/00* (2024.01)
*B60W 30/10* (2006.01)
(Continued)

(52) U.S. Cl.
CPC ........... *G05D 1/0011* (2013.01); *B60W 30/10* (2013.01); *B60W 60/001* (2020.02);
(Continued)

(58) Field of Classification Search
CPC .. G05D 1/0011; G05D 1/0061; G05D 1/0212; G05D 1/646; G05D 1/227;
(Continued)

(56) References Cited

U.S. PATENT DOCUMENTS

| 5,968,105 | A | * | 10/1999 | Burkhard | ................ | G01P 15/16 |
| | | | | | | 701/72 |
| 9,008,890 | B1 | * | 4/2015 | Herbach | ............... | B60W 30/00 |
| | | | | | | 340/436 |

(Continued)

FOREIGN PATENT DOCUMENTS

| CN | 111736602 A | * | 10/2020 | .......... G05D 1/0276 |
| JP | 2000089826 A | * | 3/2000 | |

(Continued)

OTHER PUBLICATIONS

"Finding the angle between three points?" Mathematics Stack Exchange, solution posted by user Fly By Night (Year: 2013).*

(Continued)

*Primary Examiner* — Kito R Robinson
*Assistant Examiner* — Zachary E. F. Glade
(74) *Attorney, Agent, or Firm* — MORGAN, LEWIS & BOCKIUS LLP

(57) ABSTRACT

The present disclosure relates to an autonomous vehicle and a remote control method therefor. An exemplary embodiment of the present disclosure provides an autonomous vehicle including: an autonomous driving control apparatus including: a communication device configured to communicate with a control system; and a processor configured to request remote control by transmitting a vehicle path to a control system in a situation where the remote control is required during autonomous driving, to generate a virtual path by using a corrected path received from the control system, to perform the remote control by determining validity of the virtual path, and to determine whether the remote control is ended by determining whether to return to a vehicle path for previous autonomous driving after remote driving on the virtual path.

19 Claims, 17 Drawing Sheets

(51) Int. Cl.

| | |
|---|---|
| *B60W 40/072* | (2012.01) |
| *B60W 40/105* | (2012.01) |
| *B60W 40/109* | (2012.01) |
| *B60W 60/00* | (2020.01) |
| *G05D 1/227* | (2024.01) |
| *G05D 1/646* | (2024.01) |
| *G05D 107/13* | (2024.01) |
| *G05D 109/10* | (2024.01) |

(52) U.S. Cl.
CPC ....... *B60W 60/0011* (2020.02); *G05D 1/0061* (2013.01); *G05D 1/0212* (2013.01); *G05D 1/227* (2024.01); *G05D 1/646* (2024.01); *B60W 40/072* (2013.01); *B60W 40/105* (2013.01); *B60W 40/109* (2013.01); *B60W 2556/45* (2020.02); *B60W 2556/50* (2020.02); *B60W 2756/10* (2020.02); *G05D 2107/13* (2024.01); *G05D 2109/10* (2024.01)

(58) Field of Classification Search
CPC .......... G05D 2107/13; G05D 2109/10; B60W 60/001; B60W 60/0011; B60W 2556/45; B60W 2556/50; B60W 2756/10; B60W 30/10; B60W 40/072; B60W 40/105; B60W 40/109; B60W 2050/0005; B60W 2050/005; B60W 2050/0064; B60W 2520/10; B60W 2520/125; B60W 2552/30
See application file for complete search history.

(56) References Cited

U.S. PATENT DOCUMENTS

| | | | | |
|---|---|---|---|---|
| 9,994,219 | B2 | 6/2018 | Nilsson et al. | |
| 11,164,273 | B2 * | 11/2021 | Heinla | G05D 1/0061 |
| 11,560,154 | B1 * | 1/2023 | Gate | G01C 21/3614 |
| 2020/0239023 | A1 * | 7/2020 | Srinivasan | G05D 1/0027 |
| 2020/0409368 | A1 * | 12/2020 | Caldwell | G05D 1/0212 |
| 2020/0410260 | A1 * | 12/2020 | Choe | B60W 60/0027 |
| 2021/0148726 | A1 * | 5/2021 | Ostafew | G05D 1/227 |
| 2021/0278834 | A1 * | 9/2021 | Kendoul | G05D 1/0044 |

FOREIGN PATENT DOCUMENTS

| | | | | |
|---|---|---|---|---|
| JP | 2017-174208 | | 9/2017 | |
| JP | 2019-190835 | | 10/2019 | |
| JP | 2021-039454 | | 3/2021 | |
| KR | 10-2018-0057280 | | 5/2018 | |
| KR | 10-2019-0088135 | | 7/2019 | |
| KR | 20-2019-0002271 | | 9/2019 | |
| KR | 10-2020-0074528 | | 6/2020 | |
| WO | WO-2018228670 | A1 * | 12/2018 | .............. B63H 21/21 |
| WO | WO-2022153701 | A1 * | 7/2022 | .............. G08G 1/16 |

OTHER PUBLICATIONS

CN111736602A Wu Espacenet machine translation (Year: 2020).*
WO2022153701A1 Terada Espacenet machine translation (Year: 2022).*
JP-2000089826 Adachi (Year: 2000).*
CN111736602A_Wu_translation (Year: 2020).*
Finding the Angle Between Three Points, user Fly By Night, mathematics stack exchange (Year: 2013).*
WO2022153701A1_Terada_translation (Year: 2022).*

\* cited by examiner

303

304

307

308

306

305

AUTONOMOUS VEHICLE, CONTROL METHOD FOR REMOTELY CONTROLLING THEREOF

CROSS-REFERENCE TO RELATED APPLICATION

This application claims priority to and benefits of Korean Patent Application No. 10-2022-0042187, filed in the Korean Intellectual Property Office on Apr. 5, 2022, the entire contents of which are incorporated herein by reference.

TECHNICAL FIELD

The present disclosure relates to an autonomous vehicle and a remote control method therefor, and more particularly, to a technique for determining remote control and termination of an autonomous vehicle.

BACKGROUND

As an electronic technique of a vehicle develops, an interest in an autonomous vehicle that drives to a destination by recognizing a driving environment of the vehicle itself without manipulation of a driver is growing more and more.

An autonomous vehicle refers to a vehicle capable of operating by itself without manipulation of a driver or an occupant.

While driving in an autonomous driving mode, there may be a situation in which it is impossible to follow a driving path to the destination normally although there is no abnormality in a function of the vehicle. As such, when a situation where it is impossible to follow a path occurs during autonomous driving, it is often difficult to follow the driving path, such as when the driver directly intervenes in control of the vehicle or when the driver's intervention is difficult, the vehicle stops.

The above information disclosed in this Background section is only for enhancement of understanding of the background of the disclosure, and therefore, it may contain information that does not form the prior art that is already known in this country to a person of ordinary skill in the art.

SUMMARY OF THE DISCLOSURE

An exemplary embodiment of the present disclosure has been made in an effort to provide an autonomous vehicle and a remote control method therefor, capable of remote driving control by modifying an autonomous driving path in conjunction with a control system and determining validity of the modified path when autonomous driving is impossible, and capable of enabling autonomous driving to continue without driver intervention in an emergency by ending the remote driving control when returning to a previous autonomous driving path, thereby improving reliability of an autonomous driving system.

The technical objects of the present disclosure are not limited to the objects mentioned above, and other technical objects not mentioned can be clearly understood by those skilled in the art from the description of the claims.

An exemplary embodiment of the present disclosure provides an autonomous vehicle including: an autonomous driving control apparatus including: a communication device configured to communicate with a control system; and a processor configured to: request remote control by transmitting a vehicle path to a control system in a situation where the remote control is required during autonomous driving, generate a virtual path by using a corrected path received from the control system, perform the remote control by determining validity of the virtual path, and determine whether the remote control is ended by determining whether to return to the vehicle path for previous autonomous driving after remote driving on the virtual path.

In an exemplary embodiment of the present disclosure, the processor may be configured to: generate the vehicle path at a point level including points at predetermined intervals for the autonomous driving, and transmit down-sampled path data to the control system through the communication device by performing down-sampling based on a point of the vehicle path.

In an exemplary embodiment of the present disclosure, the processor may be configured to perform up-sampling of the corrected path received from the control system.

In an exemplary embodiment of the present disclosure, the processor may be configured to: generate a lane link for the autonomous driving, and generate the vehicle path including a left lane side and a right lane side based on the lane link.

In an exemplary embodiment of the present disclosure, the processor may be configured to: generate a virtual lane link in a corrected section of the corrected path, and generate the virtual path by generating a virtual left lane side and a virtual right lane side based on the virtual lane link.

In an exemplary embodiment of the present disclosure, the processor may be configured to connect road structures of the virtual path and the vehicle path.

In an exemplary embodiment of the present disclosure, the processor may be configured to: insert the virtual path into the vehicle path, connect the virtual lane link and a lane link of the vehicle path to connect front and rear road structures of the virtual path, connect the virtual left lane side of the virtual path and the left lane side of the vehicle path, and connect the virtual right lane side of the virtual path and the right lane side of the vehicle path.

In an exemplary embodiment of the present disclosure, the processor may be configured to determine the validity of the virtual path based on vehicle dynamics.

In an exemplary embodiment of the present disclosure, the processor may be configured to: select three consecutive points among points of the corrected path, which is corrected by the control system, and calculate a length of at least one line segment between the three consecutive points.

In an exemplary embodiment of the present disclosure, the processor may be configured to calculate an area of a triangle of the three consecutive points by using the length of the at least one line segment.

In an exemplary embodiment of the present disclosure, the processor may be configured to calculate a radius of a circle including the three points by using the area of the triangle and the length of the at least one line segment.

In an exemplary embodiment of the present disclosure, the processor may be configured to: calculate a curvature by taking a reciprocal of the radius of the circle, and calculate lateral acceleration by using the curvature and a maximum longitudinal velocity.

In an exemplary embodiment of the present disclosure, the processor may be configured to: convert the lateral acceleration into gravitational acceleration, and determine whether the gravitational acceleration is smaller than a predetermined threshold, to determine the validity of the virtual path.

In an exemplary embodiment of the present disclosure, the processor may be configured to determine validity of all points of the virtual path based on the vehicle dynamics.

In an exemplary embodiment of the present disclosure, the processor may be configured to: determine a lane between a virtual left lane side and a virtual right lane side of the virtual path as a virtual lane, and determine the validity of the virtual path by determining whether an object exists in the virtual lane.

In an exemplary embodiment of the present disclosure, the processor may be configured to: determine that driving is possible on the virtual path when it is determined that there is no object on the virtual path and the validity of the virtual path based on vehicle dynamics exists, and request final confirmation from the control system.

In an exemplary embodiment of the present disclosure, the processor may be configured to: calculate a distance between coordinates of a point where an end point of the virtual path and the vehicle path meet and coordinates of a current position of the autonomous vehicle, and end the remote control by determining that the autonomous vehicle has returned to the vehicle path when the calculated distance is smaller than a predetermined reference value.

In an exemplary embodiment of the present disclosure, the processor may extract coordinates of a first point, a second point, and a third point, which are three consecutive points of the virtual path, when the second point is a current position point of the autonomous vehicle, obtain a length of a line segment between the first point and the second point and a length of a line segment between the second point and the third point, and convert the length of the line segment between the first point and the second point and the length of the line segment between the second point and the third point into unit vectors, respectively, to calculate an angle between the unit vectors.

In an exemplary embodiment of the present disclosure, the processor may be configured to end the remote control by determining that the autonomous vehicle has returned vehicle path when the angle between the unit vectors exceeds a predetermined reference value.

An exemplary embodiment of the present disclosure provides a remote control method for an autonomous vehicle, including: requesting, by a processor, remote control by transmitting a vehicle path to a control system when the remote control is required during autonomous driving; generating, by the processor, a virtual path by using a corrected path received from the control system; performing, by the processor, the remote control by determining validity of the virtual path; and determining, by the processor, whether the remote control is ended by determining whether to return to a previous vehicle path after remote driving on the virtual path.

According to the present disclosure, remote driving control may be performed by modifying an autonomous driving path in conjunction with a control system and determining validity of the modified path when autonomous driving is impossible, and capable of enabling autonomous driving to continue without driver intervention in an emergency by ending the remote driving control when returning to a previous autonomous driving path, thereby improving reliability of an autonomous driving system.

In addition, various effects that can be directly or indirectly identified through this document may be provided.

DETAILED DESCRIPTION OF THE EMBODIMENTS

Figure 1:
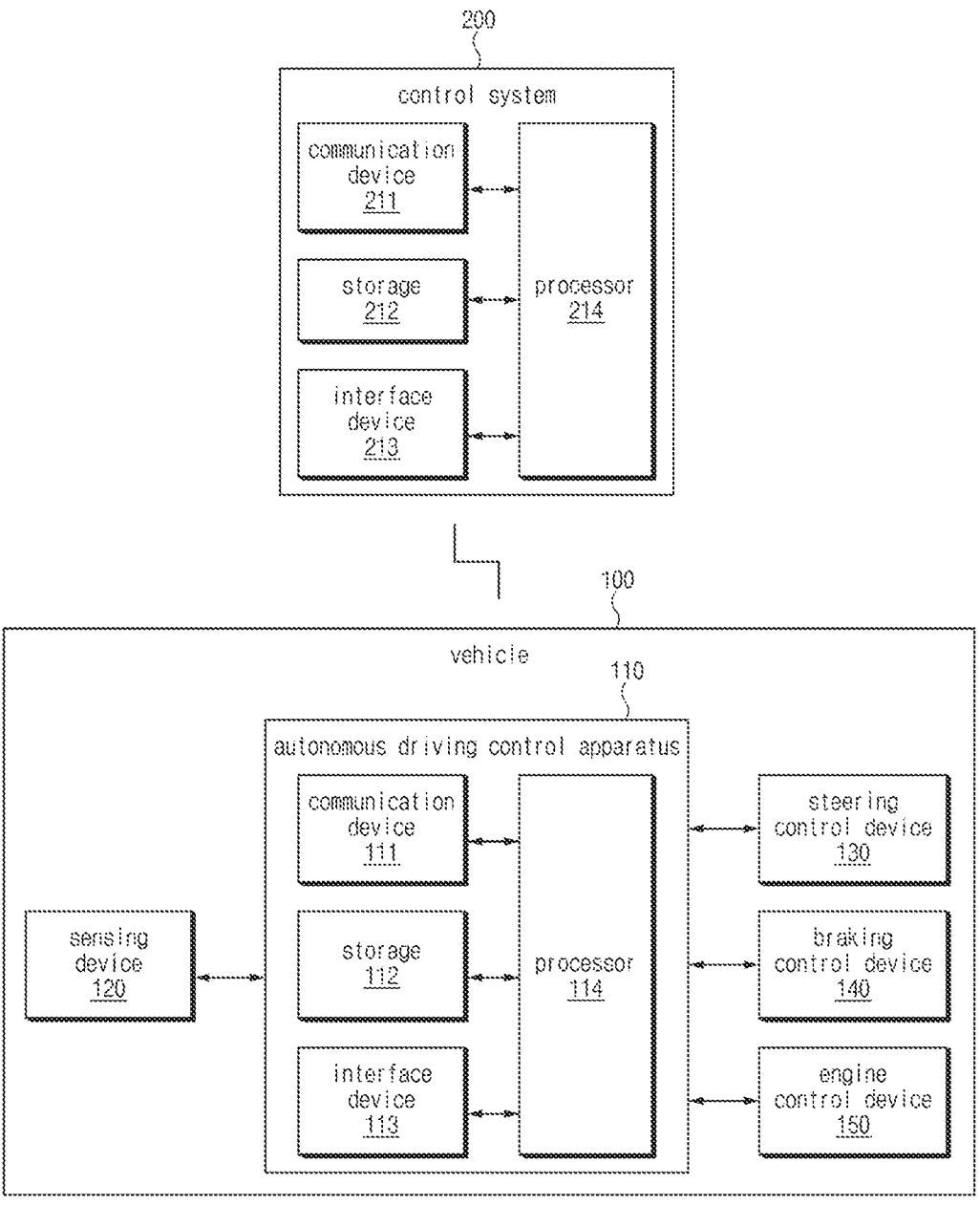
FIG. 1 illustrates a block diagram showing a configuration of a remote control system for an autonomous apparatus according to an exemplary embodiment of the present disclosure.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present disclosure will be described in detail with reference to FIG. 1 to FIG. 9.

FIG. 1 illustrates a block diagram showing a configuration of a remote control system for an autonomous apparatus according to an exemplary embodiment of the present disclosure.

Referring to FIG. 1, the remote control system for an autonomous vehicle according to an exemplary embodiment of the present disclosure includes a vehicle 100 and a control system 200, and remote control may be performed through communication between the vehicle 100 and the control system 200. In the instant case, the vehicle 100 may include an autonomous vehicle.

The vehicle 100 may include an autonomous driving control apparatus 110, a sensing device 120, a steering control device 130, a braking control device 140, and an engine control device 150.

The autonomous driving control apparatus 110 according to the exemplary embodiment of the present disclosure may be implemented inside a vehicle. In the instant case, the autonomous driving control apparatus 110 may be integrally formed with internal control units of the vehicle, or may be implemented as a separate device to be connected to control units of the vehicle by a separate connection means.

In a situation (a situation in which autonomous driving is not possible) where remote control of the autonomous vehicle required, the autonomous driving control apparatus 110 activates a remote control function and requests the control system 200 to perform remote control.

The autonomous driving control apparatus 110 may transmit vehicle position information (e.g., vehicle coordinates), vehicle surrounding information (e.g., obstacle information), and a vehicle path (e.g., a path from a departure point to a destination, etc.) when requesting the control system 200 to perform the remote control.

The autonomous driving control apparatus 110 may generate a virtual path based on a corrected path received from the control system 200 and determine validity of the virtual path, and then may receive final confirmation from the control system 200 for the virtual path, perform tracking control on the virtual path, and determine a return to a main path (existing path) after completing driving of the corrected path.

Referring to FIG. 1, the autonomous driving control apparatus 110 may include a communication device 111, a storage 112, an interface device 113, and a processor 114.

The communication device 111 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, and the like.

Furthermore, the communication device 111 may perform communication by using a server, infrastructure, or other vehicles outside the vehicle, and the like through a wireless Internet technique or short range communication technique. Herein, the wireless Internet technique may include wireless LAN (WLAN), wireless broadband (Wibro), Wi-Fi, world Interoperability for microwave access (Wimax), Ethernet communication, etc. Furthermore, short-range communication technique may include bluetooth, ZigBee, ultra wideband (UWB), radio frequency identification (RFID), infrared data association (IrDA), and the like. For example, the communication device 111 may perform wireless communication with the control system 200, may transmit vehicle position information (e.g., vehicle coordinates), vehicle surrounding information (e.g., obstacle information), a remote control request, a vehicle path, etc. to the control system 200, and may receive a corrected path, etc. from the control system 200.

The storage 112 may store sensing results of the sensing device 120, information received from the control system 200, data and/or algorithms required for the processor 114 to operate, and the like.

As an example, the storage 112 may store vehicle surrounding information (image data captured through a camera), a vehicle path (travel path from origin to destination), a corrected path received from the control system 200, a remote control command, and the like.

The storage 112 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 113 may include an input means for receiving a control command from a user and an output means for outputting an operation state of the autonomous driving control apparatus 110 and results thereof. Herein, the input means may include a key button, and may further include a mouse, a keyboard, a touch screen, a microphone, a joystick, a jog shuttle, a stylus pen, and the like. In addition, the input means may further include a soft key implemented on the display.

The output means may include a display, and may further include a voice output means such as a speaker. In this case, when a touch sensor formed of a touch film, a touch sheet, or a touch pad is provided on the display, the display may operate as a touch screen, and may be implemented in a form in which an input device and an output device are integrated.

In this case, the display may include at least one of a liquid crystal display (LCD), a thin film transistor liquid crystal display (TFT LCD), an organic light emitting diode display (OLED display), a flexible display, a field emission display (FED), or a 3D display or any combination thereof.

As an example, the interface device 113 may be implemented as a head-up display (HUD), a cluster, an audio video navigation (AVN), a human machine interface (HM), a user setting menu (USM), or the like.

For example, the interface device 113 may display the corrected path received from the control system 200, the vehicle path generated by the vehicle, and the like. The interface device 113 may receive information from a driver, and for this purpose, a mouse, a keyboard, a touch screen, and a microphone may be provided.

The processor 114 may be electrically connected to the communication device 111, the storage 112, the display device 113, and the like, may electrically control each component, and may be an electrical circuit that executes software commands, thereby performing various data processing and calculations described below.

The processor 114 may process a signal transferred between components of the autonomous driving control apparatus 110, and may perform overall control such that each of the components can perform its function normally.

The processor 114 may be implemented in the form of hardware, software, or a combination of hardware and software, or may be implemented as microprocessor, and it may be, e.g., an electronic control unit (ECU), a micro controller unit (MCU), or other subcontrollers mounted in the vehicle.

When a remote control is required during autonomous driving, the processor 114 may transmit a vehicle path to the control system 200 to request remote control. In the instant case, when driving on a corresponding path is impossible due to an obstacle or the like on the vehicle path for autonomous driving, the processor 114 may determine that the autonomous driving is impossible and remote control is required.

The processor 114 may generate a virtual path by using the corrected path received from the control system 200, and may determine validity of the virtual path, perform remote control, and perform remote driving on the virtual path, and then may determine whether to end the remote control by determining whether to return to the vehicle path for previous autonomous driving.

The processor 114 may generate a point-level vehicle path including points at predetermined intervals for autonomous driving, and may perform down-sampling based on the points of the vehicle path and transmit down-sampled path data to the control system through the communication device 111.

Furthermore, the processor 114 may perform up-sampling the corrected path received from the control system 200. In this case, the down-sampling indicates extracting point information at essential or predetermined intervals, not all data among path data of the vehicle path. In the instant case, the point information may include coordinate information of the points. In addition, the up-sampling indicates adding not only point information of a down-sampled point-level path but also path data of a section between points. Through up-sampling, points may be generated with a narrower interval than that of down-sampled points. Accordingly, the communication device 111 may minimize communication capacity by transmitting down-sampled path data to the control system 200 and receiving a down-sampled corrected path from the control system 200.

The processor 114 may generate a lane link for autonomous driving and generate a vehicle path for autonomous driving including a virtual left lane side and a virtual right lane side based on the lane link.

The processor 114 may generate a virtual path by generating a virtual lane link within a correction section of the corrected path and generating a virtual left lane side and the virtual right lane side based on the virtual lane link. That is, the virtual path may include a corrected path.

The processor 114 may connect road structures of the virtual path and the vehicle path. That is, the processor 114 may insert the virtual path into the vehicle path, may connect the virtual lane link of the virtual path and a lane link of the vehicle path to connect road structures of the front and the rear of the virtual path, may connect the virtual left lane side of the virtual path and a left lane side of the vehicle path, and may connect the virtual right lane side of the virtual path and a right lane side of the vehicle path.

The processor 114 may determine validity of the virtual path based on vehicle dynamics. To this end, the processor 114 may select three consecutive points among the points of the path corrected by the control system, may calculate a length of line segments between the three points, and may calculate an area of a triangle made of the three points by using the length of the at least one line segments between the three points. Then, the processor 114 may calculate a radius of a circle including the three points by using the area of the triangle and the length of the at least one line segments between the three points, and may calculate a curvature by taking a reciprocal of the radius of the circle.

Then, the processor 114 may calculate lateral acceleration by using the curvature and a maximum longitudinal velocity, and may convert lateral acceleration into gravitational acceleration to determine whether the gravitational acceleration is less than a predetermined threshold, so as to determine validity of the virtual path.

The processor 114 may determine validity of all points of the virtual path based on vehicle dynamics by repeating the above process, and when all the points are determined to be valid, may determine that the virtual path is a drivable path.

In addition, the processor 114 may determine a lane between a left lane side and a right lane side of the virtual path as a virtual lane, and may determine whether an object exists in the virtual lane to determine validity of the virtual path.

That is, when it is determined that there is no object on the virtual path and the validity of the virtual path based on the vehicle dynamics exists, the processor 114 may determine that driving is possible on the virtual path to request final confirmation from the control system.

The processor 114 may calculate a distance between coordinates of a point where an end point of the virtual path and the vehicle path meet and coordinates of a current position of the autonomous vehicle, and when the distance between the coordinates of the point where the end point of the virtual path and the vehicle path meet and the coordinates of the current position of the autonomous vehicle is smaller than a predetermined reference value, the processor 114 may determine that the autonomous vehicle has returned to the vehicle path to end the remote control.

The processor 114 may extract coordinates of a first point, a second point, and a third point, which are three consecutive points of the virtual path, when the second point is a current position point of the autonomous vehicle, the processor 114 may obtain a length of a line segment between the first point and the second point and a length of a line segment between the second point and the third point, and may convert the length of the line segment between the first point and the second point and the length of the line segment between the second point and the third point into unit vectors, respectively, to calculate an angle between the unit vectors.

When the angle between the unit vectors exceeds a predetermined reference value, the processor 114 may determine that the autonomous vehicle has returned to the vehicle path to end the remote control.

The sensing device 200 may include one or more sensors that sense an obstacle (e.g., a preceding vehicle or a rear vehicle) positioned around the vehicle, and measure a distance with the obstacle, a relative speed thereof, and/or steering thereof.

The sensing device 120 may include a plurality of sensors to sense an external object of the vehicle, to obtain information related to a position of the external object, a speed of the external object, a moving direction of the external object, and/or a type of the external object (e.g., vehicles, pedestrians, bicycles or motorcycles, etc.). To this end, the sensing device 120 may include an ultrasonic sensor, a radar, a camera, a laser scanner, and/or a corner radar, a lidar, an acceleration sensor, a yaw rate sensor, a torque measurement sensor and/or a wheel speed sensor, a steering angle sensor, etc. Furthermore, the vehicle 100 may further include a global positioning system (GPS) receiving device in addition to the sensing device 120. The sensing device 120 may reprocess sensed information into information that can be used by the autonomous driving control apparatus 110.

The steering control device 130 may be configured to control a steering angle of a vehicle, and may include a steering wheel, an actuator interlocked with the steering wheel, and a controller controlling the actuator.

The braking control device 140 may be configured to control braking of the vehicle, and may include a controller that controls a brake thereof.

The engine control device 150 may be configured to control engine driving of a vehicle, and may include a controller that controls a speed of the vehicle.

When receiving a vehicle path together with a remote control request from the autonomous vehicle 100, the control system 200 corrects the vehicle path to transmit it to the vehicle 100.

In the instant case, the control system 200 may receive down-sampled path data from the vehicle 100 to correct the path, and may transmit down-sampled corrected map information to the vehicle 100.

The control system 200 may include a communication device 211, a storage 212, an interface device 213, and a processor 214.

The communication device 211 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, and the like.

In addition, the communication device 211 may perform communication by using a server, infrastructure, or other vehicles outside the vehicle, and the like through a wireless Internet technique or short range communication technique. Herein, the wireless Internet technique may include wireless LAN (WLAN), wireless broadband (Wibro), Wi-Fi, world Interoperability for microwave access (Wimax), etc. Furthermore, short-range communication technique may include bluetooth, ZigBee, ultra wideband (UWB), radio frequency identification (RFID), infrared data association (IrDA), and the like. For example, the communication device 211 may perform wireless communication with the vehicle 100, may receive a remote control request and a vehicle path from the vehicle 100, and may transmit a corrected path and a remote control command to the vehicle 100.

The storage 212 may store information received from the vehicle 100, and data and/or algorithm required for the processor 214 to operate, and the like. As an example, the storage 212 may store vehicle surrounding information, a vehicle path, etc. received from the vehicle 100.

The storage 212 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 213 may include an input means capable of receiving a control command from an operator and an output means for outputting an operation state of the control system 200 and results thereof. Herein, the input means may include a key button, and may further include a mouse, a keyboard, a touch screen, a microphone, a joystick, a jog shuttle, a stylus pen, and the like. In addition, the input means may further include a soft key implemented on the display. For example, the interface device 213 may display map information in which a vehicle path, vehicle surrounding information, a current position of the vehicle, surrounding object information, etc. received from the vehicle 100 are marked. For example, the interface device 213 may include all communication terminals such as a personal computer (PC), a notebook computer, a smartphone, a tablet PC, a pad, a personal digital assistant (PDA), and a wearable device.

The output means may include a display, and may further include a voice output means such as a speaker. In this case, when a touch sensor formed of a touch film, a touch sheet, or a touch pad is provided on the display, the display may operate as a touch screen, and may be implemented in a form in which an input device and an output device are integrated.

In this case, the display may include at least one of a liquid crystal display (LCD), a thin film transistor liquid crystal display (TFT LCD), an organic light emitting diode display (OLED display), a flexible display, a field emission display (FED), or a 3D display or any combination thereof.

The processor 214 may be electrically connected to the communication device 211, the storage 212, the display device 213, and the like, may electrically control each component, and may be an electrical circuit that executes software commands, thereby performing various data processing and calculations described below.

The processor 214 may process a signal transferred between components of the control system 200, and may perform overall control such that each of the components can perform its function normally. The processor 214 may be implemented in the form of hardware, software, or a combination of hardware and software, or may be implemented as microprocessor.

When receiving a remote control request and a vehicle path from the autonomous vehicle 100, the processor 214 may correct the vehicle path to generate a corrected path, and may transmit the corrected path to the vehicle 100.

In the instant case, the processor 214 may receive information related to whether driving is possible with respect to the corrected path from the vehicle 100 to may transmit final confirmation or a new corrected path to the vehicle 100.

Figure 2A:
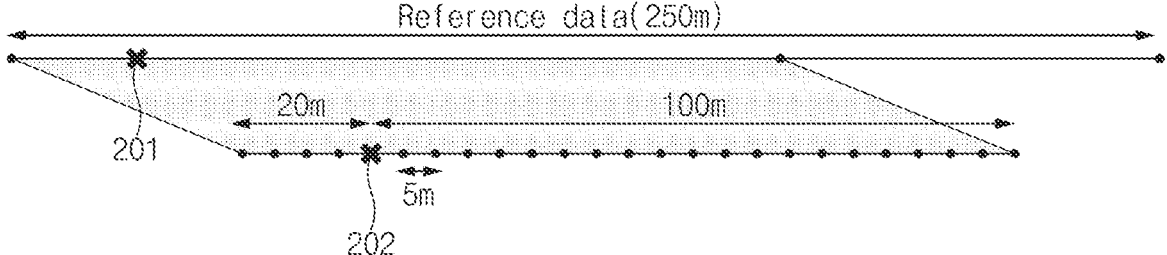
FIG. 2A illustrates a view for describing an example of down-sampling for transmitting a vehicle path according to an exemplary embodiment of the present disclosure.
Figure 2B:
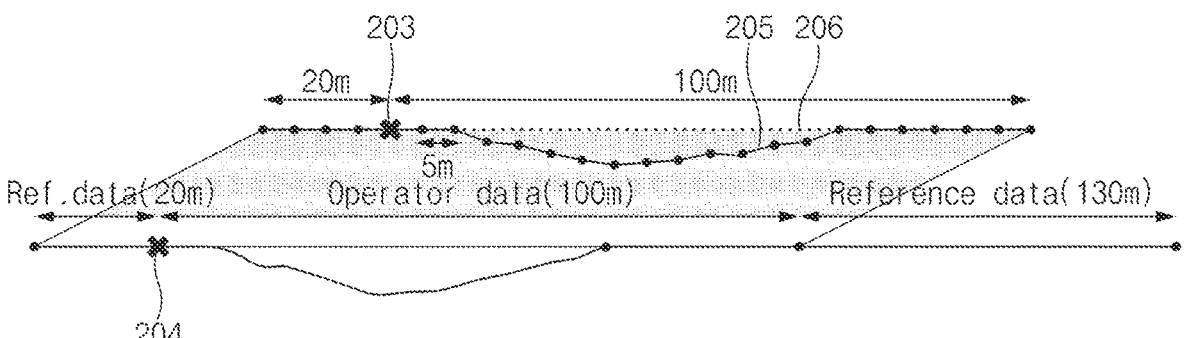
FIG. 2B illustrates a view for describing an example of up sampling for transmitting a vehicle path according to an exemplary embodiment of the present disclosure.

FIG. 2A illustrates a view for describing an example of down-sampling for transmitting a vehicle path according to an exemplary embodiment of the present disclosure, and FIG. 2B illustrates a view for describing an example of up sampling for transmitting a vehicle path according to an exemplary embodiment of the present disclosure.

The vehicle 100 generates a point level path for driving of the vehicle, and drives accordingly. The point level path includes a path including points for each predetermined interval. As such, the vehicle path generated by the autonomous vehicle 100 has high resolution, and thus has too large capacity to be transmitted to the control system 200. Accordingly, the vehicle 100 may down-sample the driving path to transmit it to the control system 200 as illustrated in FIG. 2A. It can be seen that a point level path is generated from reference data. When a current position 201 of the vehicle is displayed on the reference data to be down-sampled, point data at an interval of 5 m may be extracted from a current position 202 of the vehicle, and the extracted data can be transmitted to the control system 200. Accordingly, the control system 200 corrects the path based on down-sampled path information received from the vehicle 100 to retransmit the corrected path to the vehicle 100.

Since the corrected path received from the control system 200 is a down-sampled path and has low resolution, the vehicle 100 performs an up-sampling process as illustrated in FIG. 2B.

Referring to FIG. 2B, a control manager of the control system 200 displays a corrected path 205 by modifying the path in an existing path 206 based on a current position 203 of the vehicle on the point level path received from the control system 200. Accordingly, the vehicle 100 up-samples the corrected path and displays a forward driving path at a current position 204.

As such, a process of up-sampling the path received from the control system 200 is referred to as a pre-treatment process of path data.

Figure 3A:
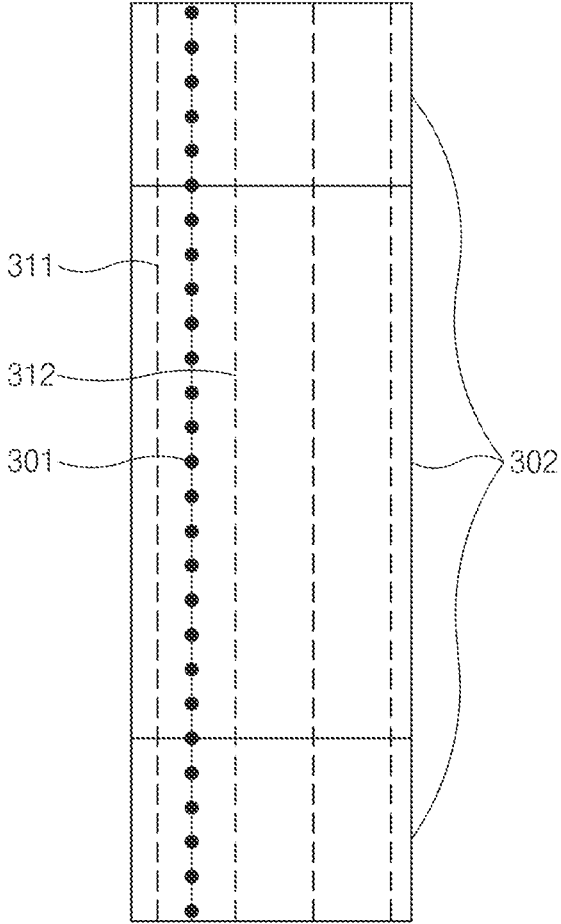
FIG. 3A to FIG. 3C illustrate views for describing a process of generating a virtual path in an autonomous vehicle according to an exemplary embodiment of the present disclosure.
Figure 3B:
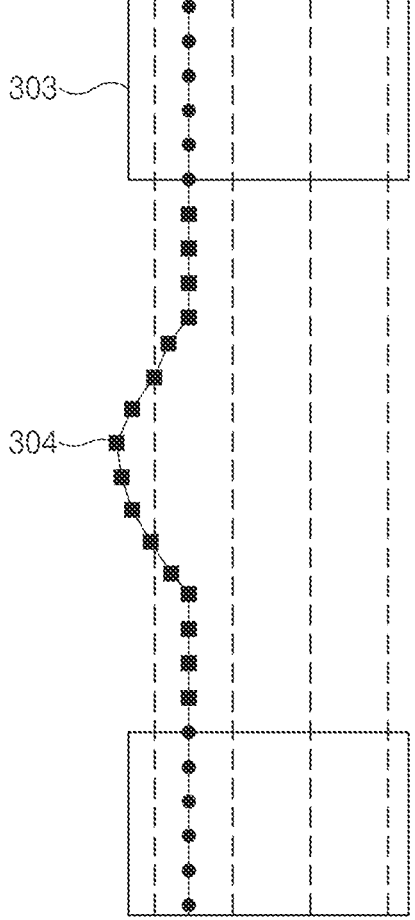
Figure 3C:
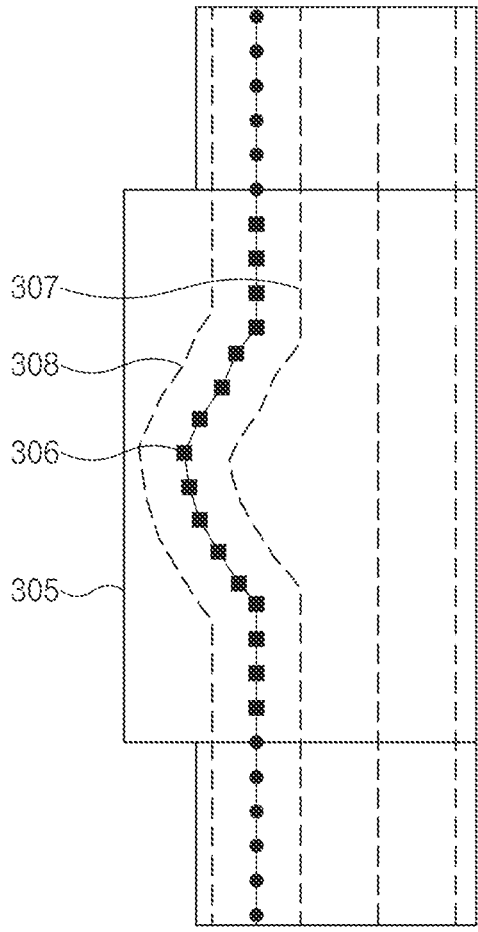

FIG. 3A to FIG. 3C illustrate views for describing a process of generating a virtual path in an autonomous vehicle according to an exemplary embodiment of the present disclosure.

Referring to FIG. 3A, the vehicle 100 generates a virtual lane link 301 for determining driving of the vehicle by using the pre-treatment processed data, and generates a virtual path including a virtual left lane side 311 and a virtual right lane side 312 based on the virtual lane link 301.

The vehicle 100 inserts a virtual road structure 302 including the generated virtual lane link 301, the virtual left lane side 311, and the virtual right lane side 312 into existing road structure data to connect front and rear road structure data.

FIG. 3A illustrates an existing road structure before virtual path generation, and FIG. 3B illustrates a virtual lane link based on the corrected path.

Referring to FIG. 3B, a corrected virtual lane link 304 corrected by a control manger among the road structures 302 may be displayed, and virtual road structure data may be generated as illustrated in FIG. 3C. Based on a corrected virtual lane link 306, a virtual road structure data 305 obtained by correcting a virtual left lane side 307 and a virtual right lane side 308 is inserted into the existing road structure data.

Figure 4:
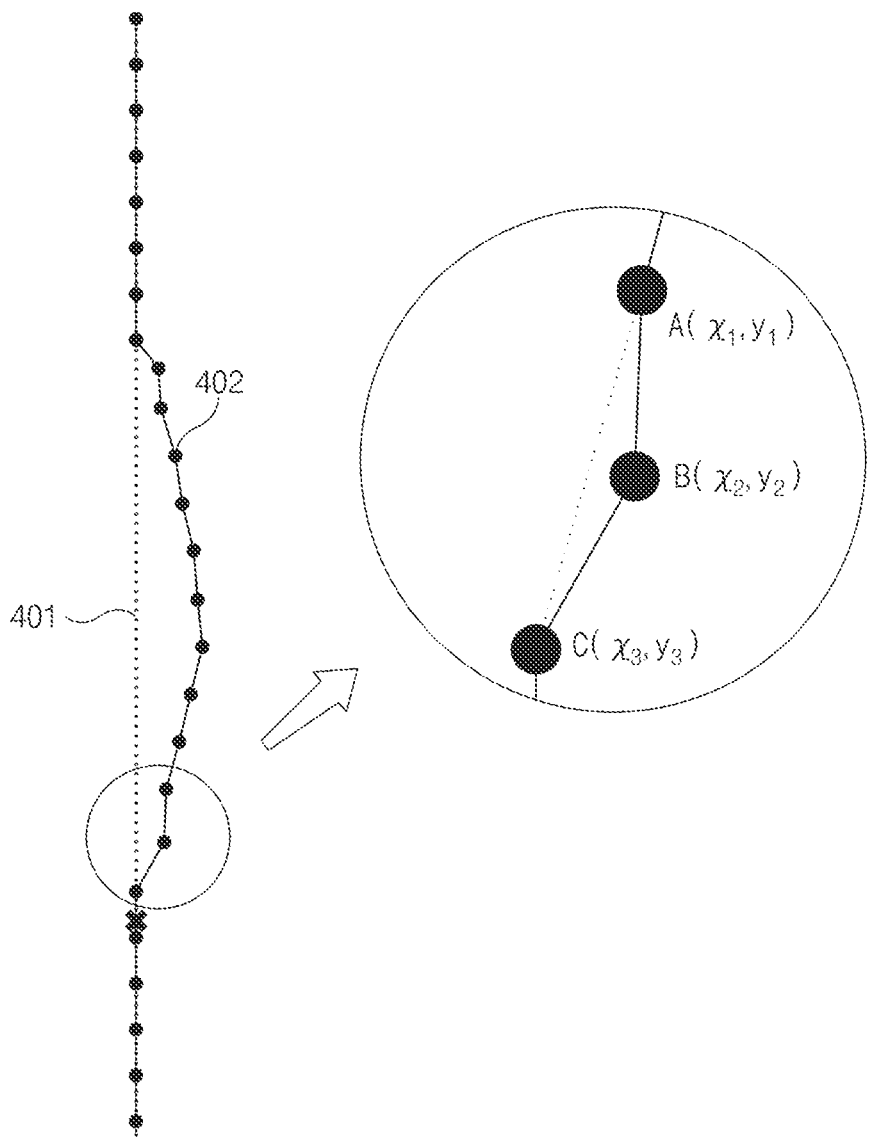
FIG. 4 illustrates a view for describing a method of determining path validity based on vehicle dynamics according to an exemplary embodiment of the present disclosure.

FIG. 4 illustrates a view for describing a method of determining path validity based on vehicle dynamics according to an exemplary embodiment of the present disclosure.

Referring to FIG. 4, the vehicle 100 may determine validity of a path received from the control system 200 based on vehicle dynamics.

The vehicle 100 first calculates a length of $l_{AB}$ a line segment AB, a length $l_{BC}$ of a line segment BC, and a length $l_{CA}$ of a line segment CA as shown in Equation 1 below.

$$l_{AB} = \sqrt{(x_2 - x_1)^2 + (y_2 - y_1)^2} \quad \text{(Equation 1)}$$
$$l_{BC} = \sqrt{(x_3 - x_2)^2 + (y_3 - y_2)^2}$$
$$l_{CA} = \sqrt{(x_1 - x_3)^2 + (y_1 - y_3)^2}$$

That is, the vehicle 100 may calculate a length of each of the line segments by using coordinate values of three points A(x1, y1), B(x2, y2), and C(x3, y3).

Then, the vehicle 100 may calculate an area $S_{ABC}$ of a triangle including the three points A(x1, y1), B(x2, y2), and C(x3, y3) by using the length $l_{AB}$ of the line segment AB, $l_{BC}$ the length of the line segment BC, and the length $l_{CA}$ of the line segment CA as shown in Equations 2 and 3 below.

$$s = \frac{l_{AB} \times l_{BC} \times l_{CA}}{2} \quad \text{(Equation 2)}$$

$$S_{ABC} = \sqrt{s(s - l_{AB})(s - l_{BC})(s - l_{CA})} \quad \text{(Equation 3)}$$

Then, the vehicle 100 calculates a radius R of a circle passing through the three points A, B, and C by using the area of the triangle $S_{ABC}$, the length $l_{AB}$ of the line segment AB, the length $l_{BC}$; of the line segment BC, and the length $l_{CA}$ of the line segment CA.

$$R = \frac{l_{AB} \times l_{BC} \times l_{CA}}{4 \times S_{ABC}} \quad \text{(Equation 4)}$$

Then, the vehicle 100 calculates a curvature r by taking a reciprocal of the radius R as shown in Equation 5 below.

$$r = \frac{1}{R} \quad \text{(Equation 5)}$$

The vehicle 100 calculates lateral acceleration Ay by using the curvature r calculated as in Equation 6 below and a maximum longitudinal velocity Vx.

$$A_y = r \times V_x^2 \quad \text{(Equation 6)}$$

Then, the vehicle 100 may convert the lateral acceleration (m/s²) into the gravitational acceleration (g) as shown in Equation 7 below, and when a corresponding value is smaller than a predetermined reference value (e.g., 0.3 g), the vehicle 100 may determine that the path is valid. In the instant case, the predetermined reference value may be predetermined by an experimental value, and may be changed at any time.

$$A_y = \frac{r \times V_x^2}{9.80665} < 0.3 \text{ g} \quad \text{(Equation 7)}$$

Thereafter, the vehicle 100 may perform Equations 1 to 7 for all points on the path received from the control system 200 by determining whether the above conditions are satisfied for all the points, and when they are satisfied, may determine that the corresponding path is valid.

Figure 5A:
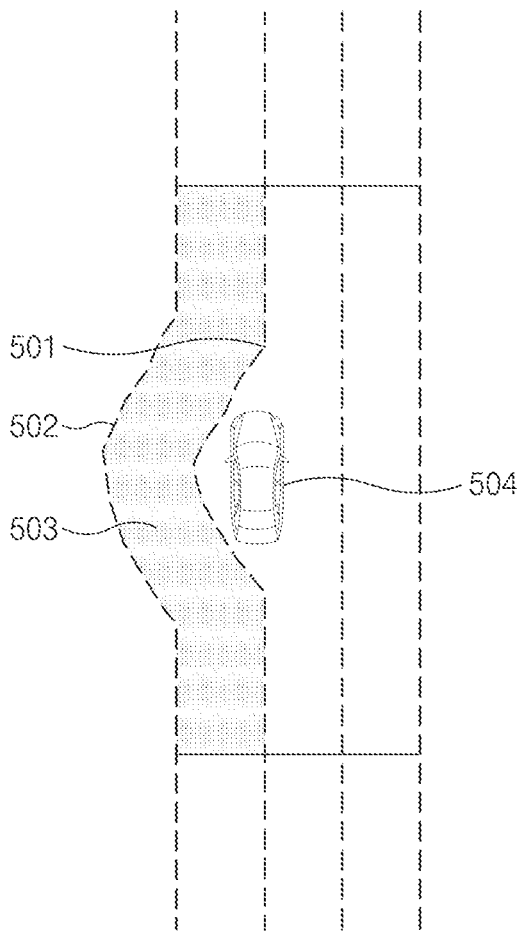
FIG. 5A and FIG. 5B illustrate views for describing a method of determining object-based path validity according to an exemplary embodiment of the present disclosure.
Figure 5B:
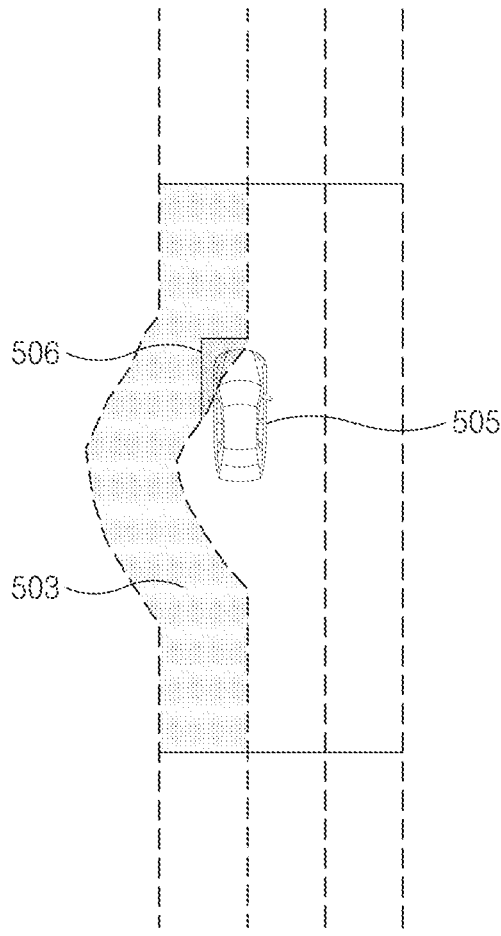

FIG. 5A and FIG. 5B illustrate views for describing a method of determining object-based path validity according to an exemplary embodiment of the present disclosure.

Referring to FIG. 5A, the vehicle 100 may determine whether the path received from the control system 200 is a drivable path or a non-drivable path by using road structure data.

The vehicle 100 configures a virtual lane 503 based on a virtual right lane side 501 and a virtual left lane side 502, and determines whether there is a space occupied by an object within the configured virtual lane 503.

That is, referring to FIG. 5A, the vehicle 100 may determine that the virtual path is valid because there is no space occupied by an object 504 in the virtual lane 503.

On the other hand, referring to FIG. 5B, the vehicle 100 may determine that the virtual path 503 is invalid because a space 506 occupied by an object 505 exists in the virtual lane 503.

Figure 6A:
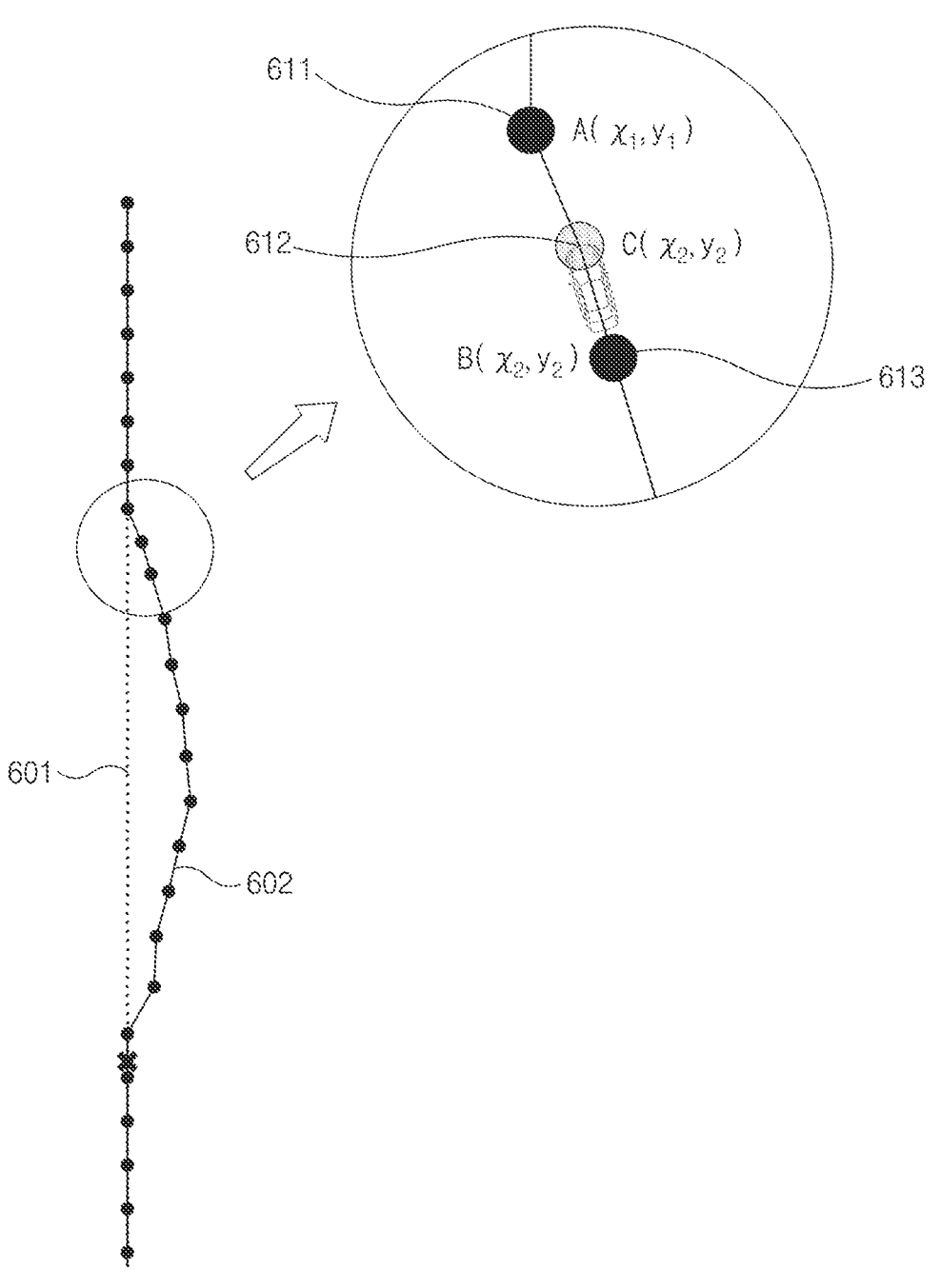
FIG. 6A and FIG. 6B illustrate views for describing a process of determining whether to end remote control according to an exemplary embodiment of the present disclosure.
Figure 6B:
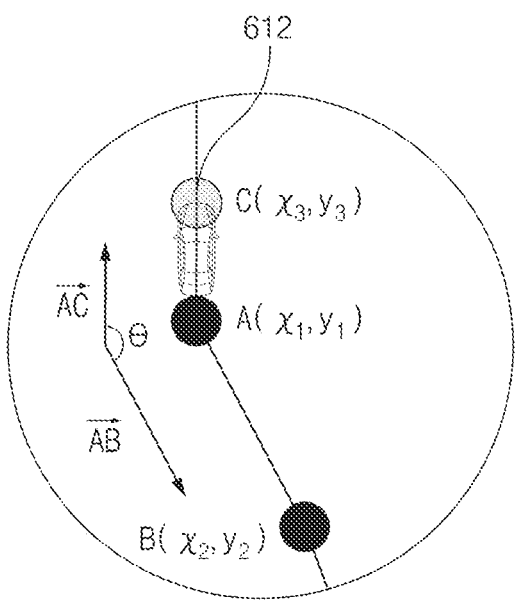

FIG. 6A and FIG. 6B illustrate views for describing a process of determining whether to end remote control according to an exemplary embodiment of the present disclosure.

The vehicle 100 may end a remote control function by checking whether the vehicle 100 normally travels on the virtual path and re-enters a main line (original path).

Referring to FIG. 6A, a situation before returning to the existing path is displayed. That is, an existing path 601 and a corrected path 602 are displayed as point data, and a point where the corrected path 602 and the existing path 601 meet is enlarged and displayed. A point 611 where the corrected path 602 and the existing path 601 meet, a current position point 612 of the vehicle, and a point 613 on the corrected path are displayed. Thereafter, it can be seen that when the vehicle returns to the existing path as illustrated in FIG. 6B, the current position point 612 of the vehicle moves.

First, the vehicle 100, as shown in Equation 8 below, may calculate a component of a ray by using points A and B, and may calculate a component of a ray by using points A and C.

$$\overrightarrow{AB} = (x_2 - x_1, y_2 - y_1)$$
$$\overrightarrow{AC} = (x_3 - x_1, y_3 - y_1)$$

(Equation 8)

Then, as shown in Equation 9, the vehicle 100 calculates magnitudes $$|\overrightarrow{AC}| \text{ and } |\overrightarrow{AB}|$$

of the rays $$\overrightarrow{AB} \text{ and } \overrightarrow{AC},$$

respectively.

$$|\overrightarrow{AB}| = \sqrt{(x_2 - x_1)^2 + (y_2 - y_1)^2}$$
$$|\overrightarrow{AC}| = \sqrt{(x_3 - x_1)^2 + (y_3 - y_1)^2}$$

(Equation 9)

Then, the vehicle 100 divides $$\overrightarrow{AB} \text{ by } |\overrightarrow{AB}| \text{ and } \overrightarrow{AC} \text{ by } |\overrightarrow{AC}|$$

to convert it into a vector as shown in Equation 10 below.

$$\overrightarrow{\widehat{AB}} = \frac{\overrightarrow{AB}}{|\overrightarrow{AB}|} =$$
$$\left( \frac{x_2 - x_1}{\sqrt{(x_2 - x_1)^2 + (y_2 - y_1)^2}}, \frac{y_2 - y_1}{\sqrt{(x_2 - x_1)^2 + (y_2 - y_1)^2}} \right)$$

$$\overrightarrow{\widehat{AC}} = \frac{\overrightarrow{AC}}{|\overrightarrow{AC}|} = \left( \frac{x_3 - x_1}{\sqrt{(x_3 - x_1)^2 + (y_3 - y_1)^2}}, \frac{y_3 - y_1}{\sqrt{(x_3 - x_1)^2 + (y_3 - y_1)^2}} \right)$$

(Equation 10)

Then, the vehicle 100 calculates an angle θ between $\overrightarrow{\widehat{AB}}$ and $\overrightarrow{\widehat{AC}}$ as shown in Equation 11 below.

$$\theta = \cos^{-1}$$
$$\left( \left( \frac{x_2 - x_1}{\sqrt{(x_2 - x_1)^2 + (y_2 - y_1)^2}} \times \frac{x_3 - x_1}{\sqrt{(x_3 - x_1)^2 + (y_3 - y_1)^2}} \right) + \right.$$
$$\left( \frac{y_2 - y_1}{\sqrt{(x_2 - x_1)^2 + (y_2 - y_1)^2}} \times \right.$$
$$\left. \left. \frac{y_3 - y_1}{\sqrt{(x_3 - x_1)^2 + (y_3 - y_1)^2}} \right) \right) \times \frac{180}{\pi}$$

(Equation 11)

Then, the vehicle 100 calculates a distance between a current position (A) of the vehicle and existing path return coordinates (C) by using the points A and C as shown in Equation 12 below.

$$|\overrightarrow{AC}| = \sqrt{(x_3 - x_1)^2 + (y_3 - y_1)^2}$$

(Equation 12)

Thereafter, the vehicle 100 determines whether both Condition 1 and Condition 2 are satisfied as shown in Equation 13 below, and when they are satisfied, the vehicle 100 determines that it has returned to the existing path and ends the remote control.

$$\text{Condition 1:} |\overrightarrow{AC}| < (TBD)m$$
$$\text{Condition 2:} \theta > (TBD)(deq)$$

(Equation 13)

TBD(m) and TBD(deq), which are predetermined reference values, may be determined by experimental values.

As such, according to the present disclosure, when autonomous driving is impossible, it is possible to enable autonomous driving to continue without driver intervention in an emergency by changing autonomous driving path in conjunction with the control system, and a virtual path, where violation of a center line is impossible by the existing autonomous driving function, can be generated to allow the center line to be violated, so that a vehicle may be controlled to follow the virtual path.

Figure 7:
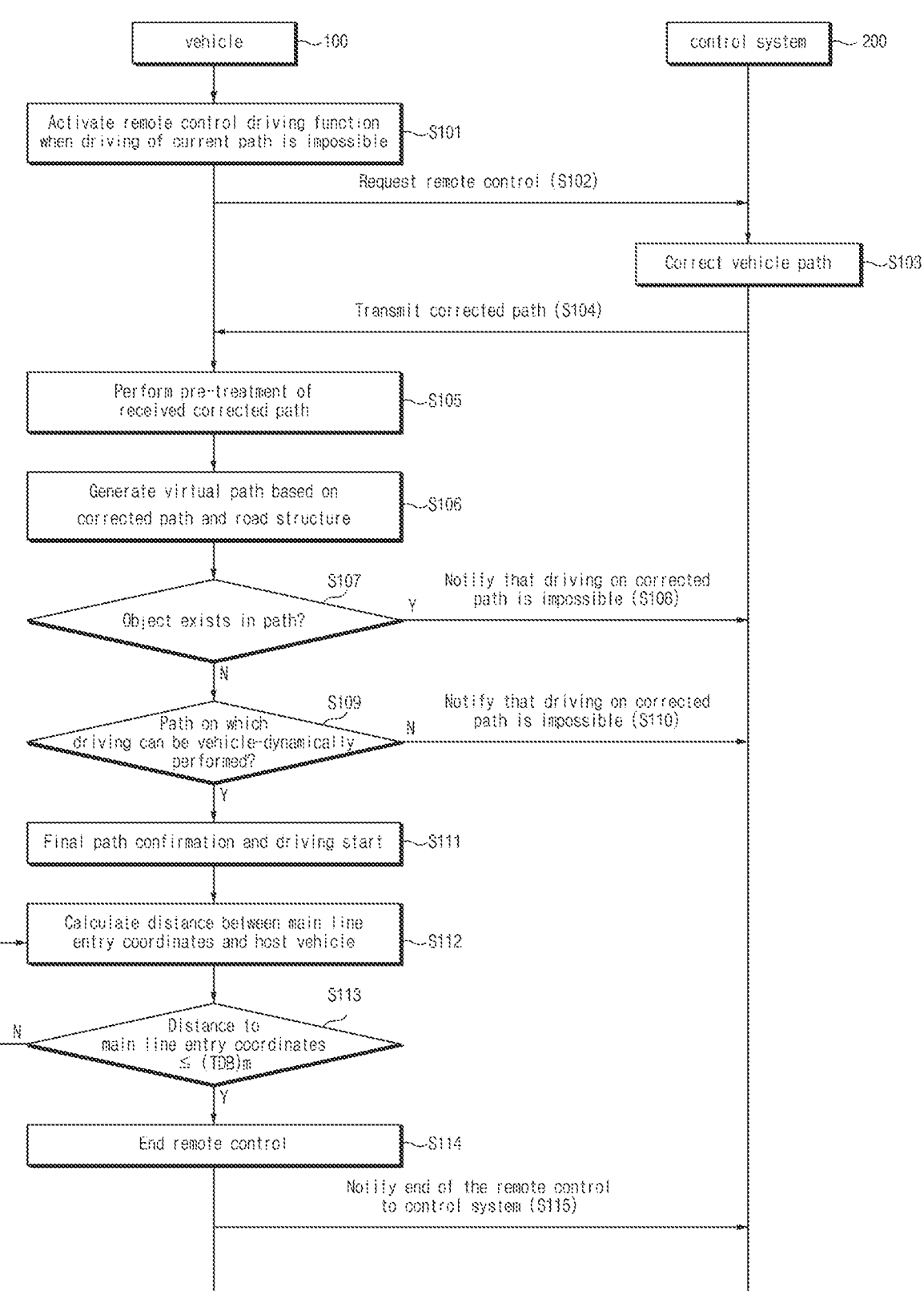
FIG. 7 illustrates a flowchart showing a remote control method for an autonomous vehicle according to an exemplary embodiment of the present disclosure.

Hereinafter, a remote control method for an autonomous vehicle according to an exemplary embodiment of the present disclosure will be described in detail with reference to FIG. 7. FIG. 7 illustrates a flowchart showing a remote control method for an autonomous vehicle according to an exemplary embodiment of the present disclosure.

Hereinafter, it is assumed that the autonomous driving control apparatus 110 of the vehicle 100 of FIG. 1 and the control system 200 perform processes of FIG. 7. In addition, in the description of FIG. 7, it may be understood that operations described as being performed by each system are controlled by a processor of each of the systems.

Referring to FIG. 7, the vehicle 100 determines whether driving of a current path is impossible due to an external environment during autonomous driving, and when the driving of the current path is impossible, activates a remote control driving function (S101) and requests the control system 200 to perform remote control (S102). In the instant case, the vehicle 100 transmits a vehicle path, vehicle surrounding information, and the like to the control system 200. Furthermore, the vehicle 100 may down-sample and transmit them to the control system 200 in order to minimize data capacity of the vehicle path.

Accordingly, the control system 200 corrects the vehicle path received from the vehicle 100 (S103). The control system 200 may correct the vehicle path based on vehicle surrounding information received from the vehicle 100 or information collected from an external server or other vehicles.

The control system 200 transmits the corrected path to the vehicle 100 (S104). Then, the vehicle 100 performs pre-treatment of the received corrected path (S105). That is, the vehicle 100 up-samples the corrected path and arbitrary path coordinates received from the control system 200.

The vehicle 100 generates a virtual path based on the pre-treated corrected path and creates a road structure based on the virtual path (S106).

That is, the vehicle 100 generates a virtual lane link by using path data of the corrected path, and creates lane sides (lanes) at left and right sides of the virtual lane link. In addition, the vehicle 100 may generate a road structure data form used inside the autonomous driving control apparatus 110 by using the generated virtual lane link and the virtual lane sides, and may update a connection relationship between front and rear roads.

Then, the vehicle 100 determines whether an object exists in the virtual path (S107), and when the object exists in the virtual path, the vehicle 100 determines that driving in the corrected path is impossible, and notifies the control system 200 that the driving on the corrected path is impossible (S108).

On the other hand, when there is no object in the virtual path, that is, when there is no risk of collision with other objects during the driving on the virtual path, the vehicle 100 determines that driving is possible on the virtual path, and determines whether the virtual path is a path on which driving can be vehicle-dynamically performed (S109). That is, the vehicle 100 uses up-sampled path data to determine whether the path received from the control system 200 is a path on which the vehicle 100 can actually drive.

Then, when it is determined that the virtual path is not the path on which the vehicle 100 can drive vehicle-dynamically, the vehicle 100 notifies the control system 200 that the driving on the corrected path is impossible (S110).

On the other hand, when the virtual path is not the path on which the vehicle 100 can drive vehicle-dynamically, the vehicle 100 requests final path confirmation for the corresponding virtual path to the control system 200 to start driving when the confirmation is completed (S111). That is, the vehicle 100 may determine validity of the path received from the control system 200 based on vehicle dynamics and based on the object, and when it is determined that the validity is normal on both the vehicle dynamics-based and the object-based basis, the vehicle 100 may request final confirmation of the corresponding path to the control system 200.

Thereafter, the vehicle 100 compares a current position of the vehicle 100 with main line entry coordinates to calculate a distance between the current position of the vehicle 100 and the main line entry coordinates (S112).

Then, the vehicle 100 determines whether the distance to the main line coordinates is smaller than or equal to a predetermined reference value (S113), and when it is smaller than that, determines that the vehicle 100 has normally returned to the existing path to end the remote control (S114). That is, the vehicle 100 determines whether the vehicle 100 has entered a main line (existing autonomous driving path) by driving the virtual path normally, and when it enters normally the main line, the vehicle 100 ends the remote control and controls it to follow an existing autonomous driving path.

Thereafter, the vehicle 100 notifies the end of the remote control to the control system 200 (S115).

Figure 8A:
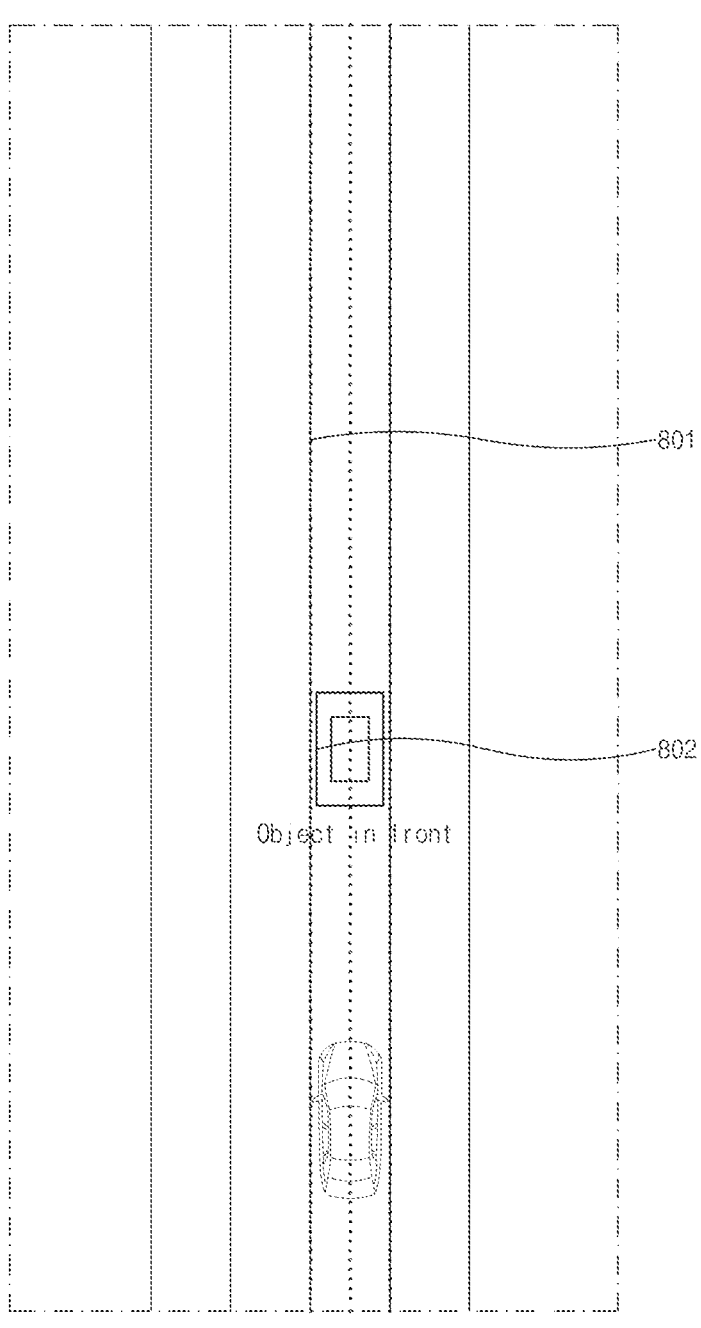
FIG. 8A illustrates an example of a screen when a remote control request is made due to occurrence of a stop due to an object in front according to an exemplary embodiment of the present disclosure.

FIG. 8A illustrates an example of a screen when a remote control request is made due to occurrence of a stop due to an object in front according to an exemplary embodiment of the present disclosure.

Referring to FIG. 8A, when the vehicle 100 stops while driving is performed on an autonomous driving path 801 because an object 802 is present in front in the autonomous driving path 801 and it cannot continue to follow the corresponding path, the vehicle 100 may make a remote control request to the control system 200.

Figure 8B:
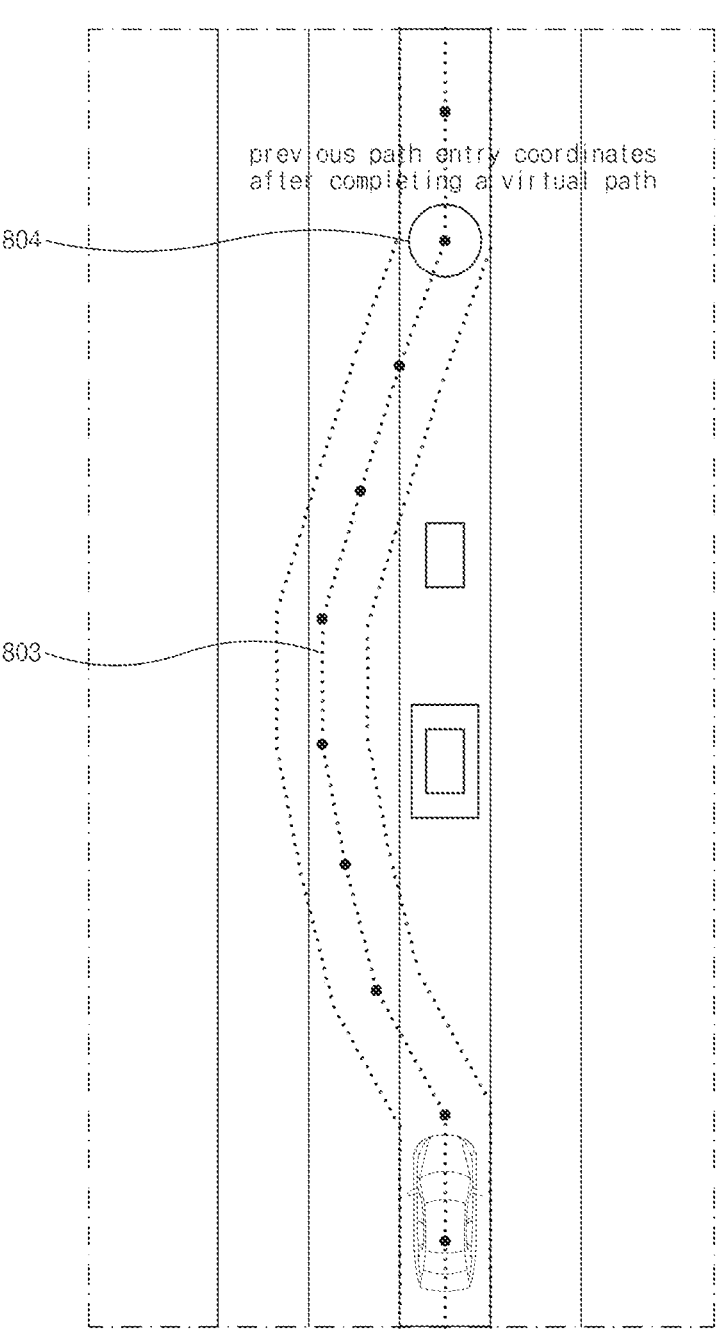
FIG. 8B illustrates an example of a screen for determining validity of a virtual path according to an exemplary embodiment of the present disclosure.

FIG. 8B illustrates an example of a screen for determining validity of a virtual path according to an exemplary embodiment of the present disclosure.

Referring to FIG. 8B, the vehicle 100 generates a virtual path 803 based on the path received from the control system 200, and controls it to follow the virtual path 803. In the instant case, a reference numeral 804 indicates a point where the virtual path 803 and the existing path 801 meet, which is the main line entry coordinate.

Figure 8C:
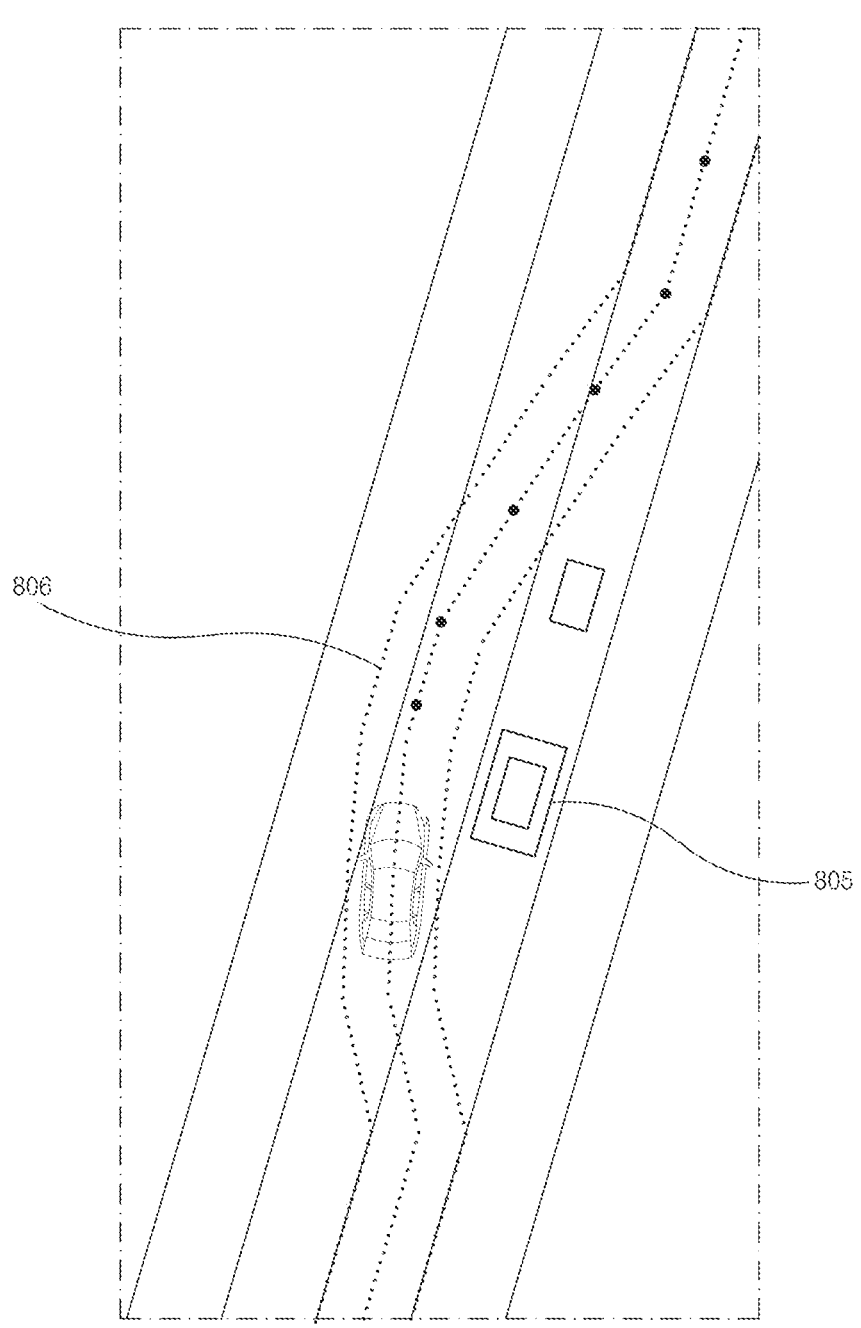
FIG. 8C illustrates an example of a screen when virtual path driving is performed after final path confirmation according to an exemplary embodiment of the present disclosure.

FIG. 8C illustrates an example of a screen when virtual path driving is performed after final path confirmation according to an exemplary embodiment of the present disclosure.

Referring to FIG. 8C, the vehicle 100 may avoid a collision with an object 805 by controlling it to follow a virtual path 806 that is finally confirmed by the control system 200.

Figure 8D:
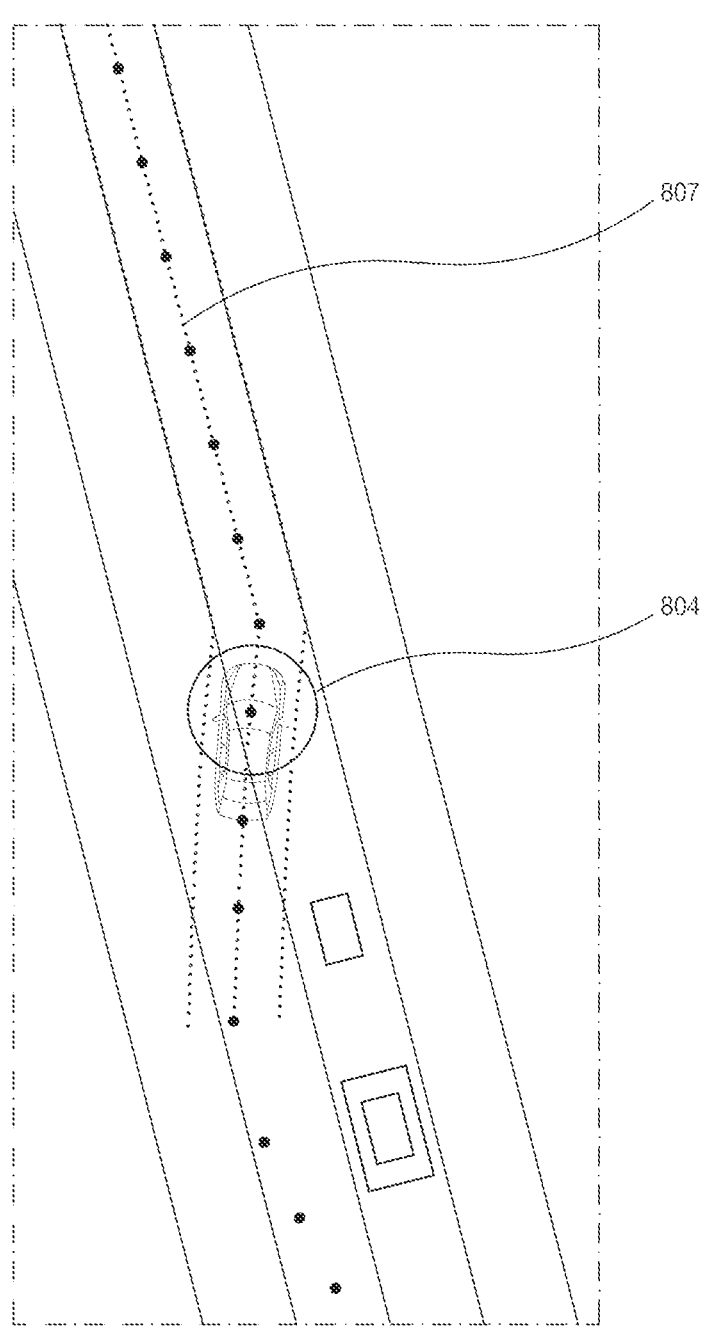
FIG. 8D illustrates an example of a screen for determining virtual path driving and main path return according to an exemplary embodiment of the present disclosure.

FIG. 8D illustrates an example of a screen for determining virtual path driving and main path return according to an exemplary embodiment of the present disclosure.

As illustrated in FIG. 8D, when the vehicle 100 reaches a main line entry coordinates 804 after driving on the virtual path, the vehicle 100 may determine that the vehicle 100 has returned to an existing path 807 normally, to end the remote control.

As such, according to the present disclosure, when driving to a destination is impossible due to a surrounding environment during autonomous driving, the vehicle 100 may request the control system 200 to perform remote control without driver involvement in the vehicle in an emergency, and may improve reliability of an autonomous driving function by generating a virtual path based on the corrected path received from the control system 200 and performing continuously the driving to the destination. Furthermore, it is possible to minimize path data transmission restriction by down-sampling and transmitting driving path data, and up-sampling corrected path data received from the control system 200 to generate a virtual path, in order to minimize data capacity when transmitting the vehicle path from the vehicle 100 to the control system 200.

Figure 9:
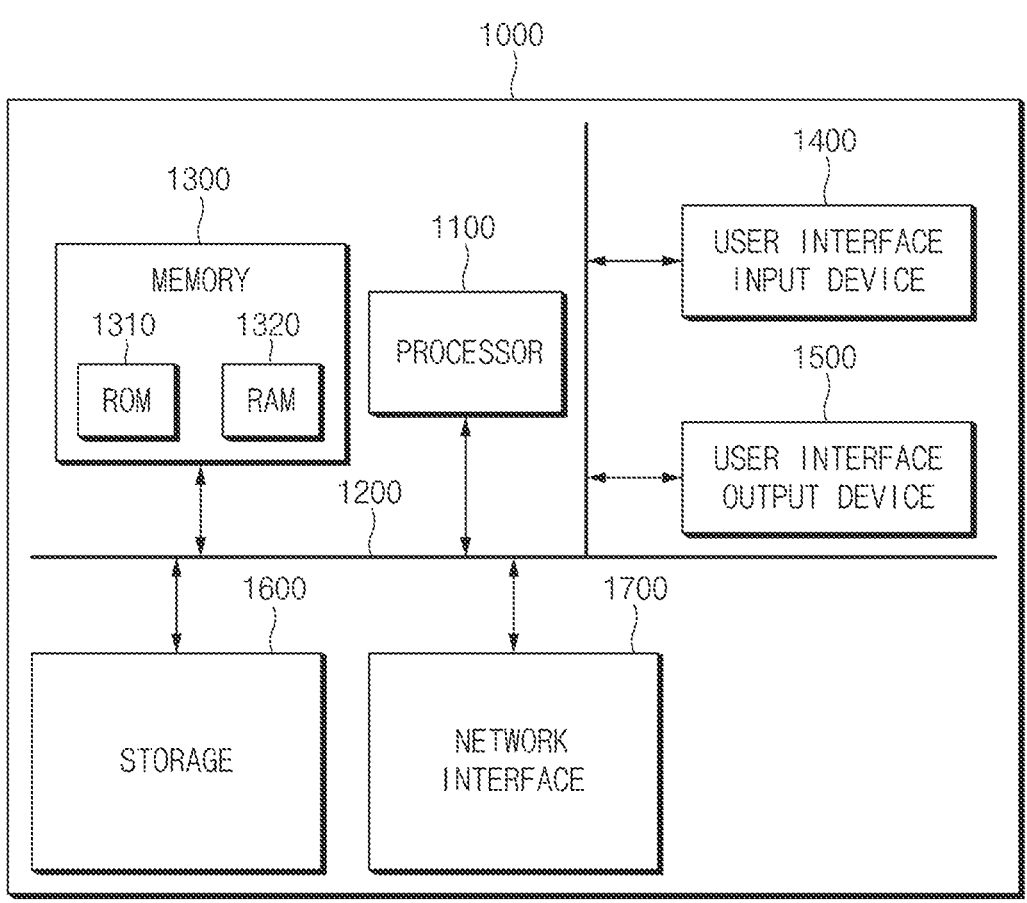
FIG. 9 illustrates a computing system according to an exemplary embodiment of the present disclosure.

FIG. 9 illustrates a computing system according to an exemplary embodiment of the present disclosure.

Referring to FIG. 9, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. An autonomous vehicle comprising:
an autonomous driving control apparatus including:
    a communication device configured to communicate with a control system; and
    a processor configured to:
        request remote control by transmitting a vehicle path to the control system in a situation where the remote control is required during autonomous driving,
        generate a virtual path by using a corrected path received from the control system,
        perform the remote control by determining validity of the virtual path,
        determine whether the remote control is ended by determining whether to return to the vehicle path for previous autonomous driving after remote driving on the virtual path, terminate the remote control and control the autonomous vehicle to follow the vehicle path, when the processor determines that the autonomous vehicle returns to the vehicle path,
        calculate a distance between coordinates of a point where an end point of the virtual path and the vehicle path meet and coordinates of a current position of the autonomous vehicle by determining absolute differences between x-coordinates and y-coordinates of two points, and calculating a Euclidean distance based on a sum of squares of the absolute differences, and end the remote control by determining that the autonomous vehicle has returned to the vehicle path when the calculated distance is smaller than a predetermined reference value.

2. The autonomous vehicle of claim 1, wherein the processor is configured to:
    generate the vehicle path at a point level including points at predetermined intervals for the autonomous driving, and
    transmit down-sampled path data to the control system through the communication device by performing down-sampling based on a point of the vehicle path.

3. The autonomous vehicle of claim 1, wherein the processor is configured to perform up-sampling of the corrected path received from the control system.

4. The autonomous vehicle of claim 1, wherein the processor is configured to:
    generate a lane link for the autonomous driving, and
    generate the vehicle path including a left lane side and a right lane side based on the lane link.

5. The autonomous vehicle of claim 4, wherein the processor is configured to:
    generate a virtual lane link in a corrected section of the corrected path, and
    generate the virtual path by generating a virtual left lane side and a virtual right lane side based on the virtual lane link.

6. The autonomous vehicle of claim 5, wherein the processor is configured to connect road structures of the virtual path and the vehicle path.

7. The autonomous vehicle of claim 5, wherein the processor is configured to:
    insert the virtual path into the vehicle path,
    connect the virtual lane link and the lane link of the vehicle path to connect front and rear road structures of the virtual path,
    connect the virtual left lane side of the virtual path and the left lane side of the vehicle path, and
    connect the virtual right lane side of the virtual path and the right lane side of the vehicle path.

8. The autonomous vehicle of claim 1, wherein the processor is configured to determine the validity of the virtual path based on vehicle dynamics.

9. The autonomous vehicle of claim 8, wherein the processor is configured to:
    select three consecutive points among points of the corrected path, which is corrected by the control system, and
    calculate a length of at least one line segment between the three consecutive points.

10. The autonomous vehicle of claim 9, wherein the processor is configured to calculate an area of a triangle of the three consecutive points by using the length of the at least one line segment.

11. The autonomous vehicle of claim 10, wherein the processor is configured to calculate a radius of a circle including the three consecutive points by using the area of the triangle and the length of the at least one line segment.

12. The autonomous vehicle of claim 11, wherein the processor is configured to:
    calculate a curvature by taking a reciprocal of the radius of the circle, and
    calculate lateral acceleration by using the curvature and a maximum longitudinal velocity.

13. The autonomous vehicle of claim 12, wherein the processor is configured to:

convert the lateral acceleration into gravitational acceleration, and determine whether the gravitational acceleration is smaller than a predetermined threshold to determine the validity of the virtual path.

14. The autonomous vehicle of claim 13, wherein the processor is configured to determine validity of all points of the virtual path based on the vehicle dynamics.

15. The autonomous vehicle of claim 1, wherein the processor is configured to:

determine a lane between a virtual left lane side and a virtual right lane side of the virtual path as a virtual lane, and determine the validity of the virtual path by determining whether an object exists in the virtual lane.

16. The autonomous vehicle of claim 1, wherein the processor is configured to:

determine that driving is possible on the virtual path when it is determined that there is no object on the virtual path and the validity of the virtual path based on vehicle dynamics exists, and request final confirmation from the control system.

17. The autonomous vehicle of claim 1, wherein the processor is configured to:

extract coordinates of a first point, a second point, and a third point, which are three consecutive points of the virtual path, when the second point is a current position point of the autonomous vehicle, obtain a length of a line segment between the first point and the second point and a length of a line segment between the second point and the third point, and convert the length of the line segment between the first point and the second point and the length of the line segment between the second point and the third point into unit vectors, respectively, to calculate an angle between the unit vectors.

18. The autonomous vehicle of claim 17, wherein the processor is configured to end the remote control by determining that the autonomous vehicle has returned to the vehicle path when the angle between the unit vectors exceeds a predetermined reference value.

19. A remote control method for an autonomous vehicle, comprising:

requesting, by a processor, remote control by transmitting a vehicle path to a control system when the remote control is required during autonomous driving;

generating, by the processor, a virtual path by using a corrected path received from the control system;

performing, by the processor, the remote control by determining validity of the virtual path;

determining, by the processor, whether the remote control is ended by determining whether to return to a previous vehicle path after remote driving on the virtual path;

terminating the remote control, and controlling the autonomous vehicle to follow the vehicle path, when the processor determines that the autonomous vehicle returns to the vehicle path;

calculating a distance between coordinates of a point where an end point of the virtual path and the vehicle path meet and coordinates of a current position of the autonomous vehicle by determining absolute differences between x-coordinates and y-coordinates of two points, and calculating a Euclidean distance based on a sum of squares of the absolute differences; and ending the remote control by determining that the autonomous vehicle has returned to the vehicle path when the calculated distance is smaller than a predetermined reference value.

\* \* \* \* \*